United States Patent [19]

Bechara et al.

[11] 4,116,879
[45] Sep. 26, 1978

[54] QUATERNARY HYDROXYALKYL TERTIARY AMINE BASES AS POLYURETHANE CATALYSTS

[75] Inventors: Ibrahim S. Bechara, Boothwyn; Felix P. Carroll, Chester; Rocco L. Mascioli, Media, all of Pa.; John R. Panchak, Wilmington, Del.

[73] Assignee: Air Products and Chemicals, Inc., Allentown, Pa.

[21] Appl. No.: 713,307

[22] Filed: Aug. 10, 1976

Related U.S. Application Data

[60] Division of Ser. No. 497,194, Aug. 14, 1974, Pat. No. 3,988,267, which is a continuation-in-part of Ser. No. 377,447, Jul. 9, 1973, Pat. No. 3,872,687.

[51] Int. Cl.² ............... B01J 31/02; B01J 27/24; C08J 9/00; C07C 87/30
[52] U.S. Cl. ..................... 252/426; 252/438; 260/567.6 M; 521/118; 521/902; 521/904
[58] Field of Search ............... 252/426, 438; 260/2.5 AC, 2.5 AW, 567.6 M

[56] References Cited

U.S. PATENT DOCUMENTS

| | | | |
|---|---|---|---|
| 3,010,963 | 11/1961 | Erner | 260/2.5 AC X |
| 3,010,963 | 11/1961 | Erner | 252/426 X |
| 3,620,987 | 11/1971 | McLaughlin et al. | 260/2.5 AW X |
| 3,726,816 | 4/1973 | Pabris et al. | 260/2.5 AC |
| 3,746,709 | 7/1973 | Patton et al. | 260/25 AC X |
| 3,766,103 | 10/1973 | Patton | 260/2.5 BF |
| 3,892,687 | 7/1975 | Bechara et al. | 252/426 X |

OTHER PUBLICATIONS

Journal Chemical Society Part (B) 1969, pp. 1062-1068, Laird, et al.
Industrial and Engineering Chemistry, vol. 48 (1956) pp. 86-87 Shechter et al.

*Primary Examiner*—Patrick P. Garvin
*Assistant Examiner*—William G. Wright
*Attorney, Agent, or Firm*—Richard A. Dannells, Jr.; Barry Moyerman

[57] ABSTRACT

Catalysts having the following formula have been found to have unexpectedly high activity for the production of polyurethane and polyisocyanate resins:

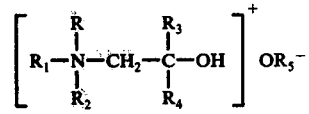

where:

$R$, $R_1$ and $R_2$ are alkyls having 1 to 4 carbon atoms,
$R_3$ and $R_4$ are independently selected from the group consisting of H, alkyls having 1 to 12 carbon atoms and aryls and aralkyls having 6 to 18 carbon atoms, and
$R_5$ is selected from the group consisting of H, an alkyl having 1 to 2 carbon atoms and an aryl and an aralkyl having 6 to 15 carbon atoms.

2 Claims, No Drawings

QUATERNARY HYDROXYALKYL TERTIARY AMINE BASES AS POLYURETHANE CATALYSTS

CROSS REFERENCE TO RELATED APPLICATION

This is a division of application Ser. No. 497,194 filed Aug. 14, 1974, now U.S. Pat. No. 3,988,267 which is a continuation-in-part of application Ser. No. 377,447, filed July 9, 1973 now U.S. Pat. No. 3,872,687.

BACKGROUND OF THE INVENTION

1. Field of the Invention

This invention relates to cellular polyurethane compositions and more particularly to a catalyst composition for use in promoting the formation of polyurethane foams.

2. Prior Art

The reaction of an isocyanato group with hydroxy groups can proceed at a significant rate because of the temperature of the reaction medium, but can be accelerated by the presence of an appropriate catalyst. Similarly, the reaction between the isocyanato group and water for the generation of a carbon dioxide blowing agent can be accelerated by a suitable catalyst. The dimerization and trimerization of isocyanates can also be accelerated by the proper catalyst.

The order of activity of numerous catalysts have been studied in simple systems, but such data has proven to be of little value in predicting the degree of suitability of a specific composition as a catalyst for the transformation of a precursor into a polyurethane foam under industrial conditions. Amine catalysts have been highly advantageous for promoting polyurethane polymerization; see *Polyurethanes: Chemistry and Technology*, Vol. I, Saunders and Frisch, Interscience Publishers, N.Y. (1962), at pages 138 - 139, 161 - 163 and 173 - 180. Quaternary ammonium compounds, which under the conditions of a prepolymerization reaction of a two-step process produce foamed polyurethane resins, decompose to liberate tertiary amines as disclosed in Reis, U.S. Pat. No. 2,779,689 and Parker, U.S. Pat. No. 2,981,700. Examples of quaternary ammonium compounds which are disclosed for this purpose are the essential neutral salts formed by the reaction of a tertiary amine such as N-methyl morpholine with the anhydride of a carboxylic acid such as acetic acid. Such quaternary salts have less catalytic activity than the tertiary amines from which they are derived.

Erner, U.S. Pat. No. 3,010,963, discloses the use as polyurethane foam catalysts of such quaternary hydroxyalkyl tertiary heterocyclic amine bases as N-β-hydroxyalkyl-diazabicyclooctane hydroxide having the following formula:

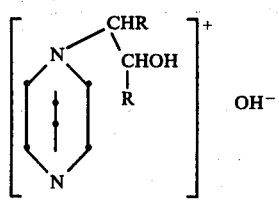

where:
R is hydrogen or an alkyl group having 1 to 10 carbon atoms.

Patton et al, U.S. Pat. No. 3,766,103, disclose a method for preparing a co-catalyst for the manufacture of rigid plastics which co-catalyst comprises an adduct of 1,3,5-tris (N,N-dialkylaminoalkyl)-s-hexahydrotriazine, an alkylene oxide and water. The resulting hexahydrotriazine co-catalyst is completely outside the scope of the catalyst compositions of the present invention.

The preparation of a quaternary hydroxyalkyl tertiary amine base, e.g. dimethyl-bis [β-oxy-ethyl]-ammonium hydroxide, also written as N,N-dimethyl-N,N-dihydroxyethyl ammonium hydroxide, is disclosed in Beilstein, *Organische Chemie*, Vol. IV (1922), at page 284. A process for producing such quaternary ammonium bases is disclosed in Ulrich, et al, U.S. Pat. No. 2,173,069, in which an alkylene oxide is reacted with a tertiary amine in aqueous medium having an initial pH of 8 to 9. Such products have been disclosed as being useful as additives in the printing of fabrics and in the preparation of artificial fibers, as well as in the preparation of dyestuff pastes and powders.

German Offenlegungschrift No. 1,801,822 discloses the preparation of such quaternary ammonium-hydroxyaryl compounds having the following formula:

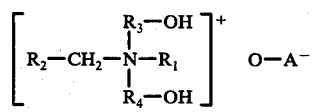

where:
R$_1$ is a higher molecular weight aliphatic group having, for example, 12 - 16 carbon atoms,
R$_2$ is a monocyclic benzene group,
R$_3$ and R$_4$ each is a low molecular weight aliphatic group, and
A is at most a 2-membered ring containing aromatic groups.

The compounds are disclosed to have utility as bactericides and fungicides.

Laird et al, Journal Chemical Society, Part 3 (1969), at pages 1062 - 1068, disclose quaternary ammonium alkoxide compounds and Shechter et al, Industrial and Engineering Chemistry, Vol. 48 (1956), at pages 86 - 87, disclose quaternary ammonium hydroxide compounds. These latter references teach the reaction of an alkylene oxide, an alcohol and a tertiary amine. Neither of these compounds is disclosed to have utility as a polyurethane catalyst.

SUMMARY OF THE INVENTION

In accordance with the present invention, in a method for the preparation of cellular polyurethane resins, a catalyst is provided comprising a quaternary hydroxyalkyl tertiary amine base having the formula

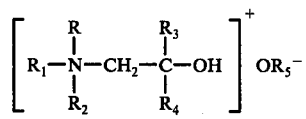

where:
R, R$_1$ and R$_2$ are alkyls having 1 to 4 carbon atoms,
R$_3$ and R$_4$ are independently selected from the group consisting of H, alkyls having 1 to 12 carbon atoms and aryls and aralkyls having 6 to 18 carbon atoms, and $R_5$ is selected from the group consisting of H, an alkyl having 1 to 2 carbon atoms and an aryl and an aralkyl having 6 to 15 carbon atoms.

This catalyst is particularly useful in the process for making polyurethane and polyurethane-polyisocyanurate foams in which the catalyst is combined with a precursor comprising a polyol, a polyisocyanate, a blowing agent and a foam stabilizer in a suitable mixing device to produce the foamed plastic by techniques well known in the art.

The polyol contains at least two alkanol groups per molecule. Suitable examples include polyethylene glycol, polypropylene glycol, a linear polyester such as glycolterphthalate, glycolsuccinate, tetramethyleneglycol adipate or other hydroxy terminated linear ester. Also the polyol may be glycerol, a polyethylene ether derivative of glycerol, erythritol, pentaerythritol, mannitol, sorbitol, α -methyl glucoside and sucrose. The polyol may be a poly(oxyalkylene)polyol derived from a polyamine such as ethylenediamine or a polyalkylene oxide derivative of a starch. Mixtures of the polyols are statisfactory. satisfactory.

The polyisocyanate contains at least two isocyanate groups per molecule such as a tolylene diisocyanate (TDI). It is generally advantageous to employ an undistilled mixture of a technical grade of TDI. Any of the other conventionally employed polyisocyanates such as diisocyanatodiphenylmethane, condensation products providing a plurality of phenyl groups and a plurality of isocyanato groups, hexamethylenediisocyanate, chlorophenyldiisocyanate, bromophenyldiisocyanate, tetraisocyanatodiphenylmethane, and the like may be used.

The blowing agent may be water and/or a volatilizable organic agent such as dichlorodifluoromethane - Freon 12; dichlorofluoromethane; trichloromonofluoromethane; 1,1-dichloro-1-fluoroethane; 1-chloro-1,1-difluoro-2,2-dichloroethane; 1,1,1-trifluorobutane; 2-chloro-2-fluorobutane; 3,3-difluorobutane; 4,4,4-trifluorobutane; 1,1-difluoroethane; $C_4F_8$ cyclic - Freon C-318; dichlorotetrafluoroethane - Freon 114; trichlorotrifluoroethane - Freon 113; methylene chloride; carbon tetrachloride; butanes; pentanes; heptanes; and the like. Any suitable blowing agent may be employed in the precursor of the present invention.

The foam stabilizer or surfactant which is preferably included in the precursor may be any compound effective in favoring the retention of the gas generated during the polymerization reaction, whereby relatively small cell size is attained as distinguished from the evolution of the very large cells. The foam stabilizer may be of the silicone type, such as silicone block polymers comprising polyalkyleneglycol units. Another effective cell stabilizer composition is the free radical initiated polymerization product of N-vinyl pyrrolidone or N-vinyl pyrrolidone and dibutyl maleate or N-vinyl pyrrolidone, dibutyl maleate and vinyl acetate in a medium of a polyfunctional polyether polyol as disclosed in application Ser. No. 180,183, filed Sept. 13, 1971, now U.S. Pat. No. 3,746,663, which disclosure is incorporated herein by reference.

The process for preparing the quaternary hydroxyalkyl tertiary amine bases of the present invention, in general, comprises reacting stoichiometric amounts of either water or a carbinol, a tertiary amine and an alkylene oxide at controlled temperatures in the range of 0° to about 100° C, preferably 10° to 40° C.

The tertiary amines to prepare the catalyst of this invention have the formula

where:

R, $R_1$ and $R_2$ are as defined above. Specific examples of the tertiary amines include trimethylamine, triethylamine, tripropylamine and triisobutylamine.

The alkylene oxides have the formula

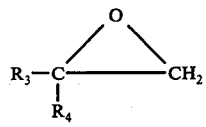

where:

$R_3$ and $R_4$ are defined as above. Examples of such alkylene oxides which are particularly suitable in the catalyst of this invention include propylene oxide, ethylene oxide, 1,2-butylene oxide, 1,2-pentene oxide, styrene oxide, the dioxides of dienes, e.g. butadiene epoxide, diepoxides prepared from bisphenol(p,p'-dihydroxydiphenyldimethylmethane) and epichlorohydrin, an olefin oxide having 9 - 14 carbon atoms and mixtures thereof.

The carbinols are selected from those having the formula $R_5OH$ where:

$R_5$ is defined as above. Examples include methanol, ethanol, benzyl alcohol, furfuryl alcohol, allyl alcohol, phenol, octylphenol, nonylphenol, methylphenol, methoxyphenol, ethoxyphenol, 3-diethylamino phenol, naphthol, resorcinol, 1,4-hydroquinone, chlorophenols, chloronaphthols and p,p'-dihydroxydiphenyldimethylmethane.

The reaction to produce the quaternary hydroxyalkyl tertiary amine base catalysts of the present invention can be represented by the following equation:

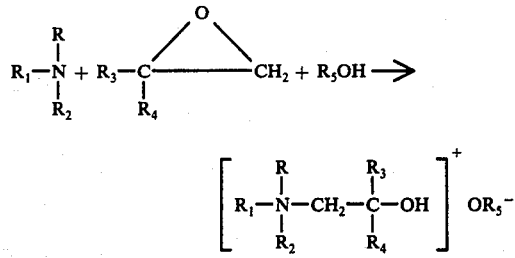

The catalyst composition of this invention is preferably derived from a reaction employing substantially stoichiometric amounts of the tertiary amine, the water or carbinol and the alkylene oxide. Excess amine can be employed if desired. The mole ratio of the tertiary amine to the water or carbinol to the alkylene oxide is generally in the range of about 2:1:1 to 1:1:1. The reaction may be carried out in the presence of a solvent such as dipropylene glycol, toluene, 1,4-dioxane, dimethyl foramide, sulpholane, hexane and the like. The molecular weight of the quaternary hydroxyalkyl tertiary amine catalyst is much larger than that of the tertiary amine from which it is derived so that the weight percent of the tertiary amine based on the weight of the total composition is less than 50 and usually is in the range of about 0 to 40% by weight.

The concentration of the quaternary catalyst composition in the precursor is usually in the range of 0.5 to 2 parts per 100 parts by weight of polyol and is preferably in the range of 0.8 part to 1.5 part per 100 parts of polyol. The final selection of the catalyst concentration is left up to the operator of the plant and it depends on many factors including the type of precursor, the conditions employed, the specific catalyst and whether a co-catalyst is employed.

The Examples below illustrate the method of the preparation of the catalysts of the present invention and their use in polymerization.

EXAMPLES 1 – 3

These Examples illustrate the preparation of the quaternary hydroxyalkyl ammonium hydroxide catalysts of this invention. Into a round bottomed flask equipped with a reflux condenser, a stirrer, a thermometer and an additional funnel were charged one mole of a tertiary amine, one mole of a carbinol and in Examples 1 and 3, an equal amount by weight of dipropylene glycol (DPG) as the solvent. The mixture was stirred and then one mole of propylene oxide was added dropwise while keeping the temperature of the reaction mixture below 80° C. After the addition of the propylene oxide was completed, the mixture was allowed to stir for two more hours and then analyzed by nonaqueous titration with hydrochloric acid. From the titration curves the milli-equivalents per gram of quaternary compounds formed as well as the residual unreacted milli-equivalents per gram of tertiary amine were determined. Table I summarizes the various compounds prepared by this method and their analytical data.

EXAMPLES 4 – 6

These Examples illustrate the method of the present invention using the catalyst of Examples 1 – 3 as polyisocyanurate catalysts.

Each sample of polyisocyanurate foam was prepared using a precursor containing:

|  | Amount |  |
|---|---|---|
| Voranol® RS-350[1] | 20 | grams |
| Silicone surfactant DC-193[2] | 1.5 | grams |
| Trichloromonofluoromethane | 20 | grams |
| Mondur® MR[3] | 100 | grams |

[1]Voranol® RS-350 is a polyol formed from the reaction of sucrose, glycerine and propylene oxide, has an equivalent weight of 160 and a hydroxyl number of 350 and is manufactured by Dow Chemical Company.
[2]DC-193 surfactants comprise polysiloxane polyoxyalkylene block copolymers such as those described in U.S. Pat. Nos. 2,834,748 and 2,917,480 and is manufactured by Dow-Corning Co.
[3]Mondur MR is polymethylene polyphenyl isocyanate containing 32% of NCO group, has an equivalent weight of 132 and is manufactured by Mobay Chemical Company.

The precursor and selected catalysts were subjected to a standard hand mixed procedure for the "one-shot" preparation of a rigid foam. Measurements were taken during the procedure of the cream time, gel time, rise time and tack free times. Table II below indicates the amount of catalyst used in each run and the resulting times achieved in the production of the rigid foams.

CONTROL 1

The Control was used with the same precursor and foam preparation procedure that were followed in Examples 4 – 6 and the results are compared with the catalysts of this invention in Table II.

TABLE II

|  | Catalyst | Conc. as % by wt. of Isocyanate Used | Results, seconds | | | |
|---|---|---|---|---|---|---|
|  |  |  | Cream Time | Gel Time | Tack-free Time | Rise Time |
| Control 1 | DMP-30* | 5 | 20 | 43 | 110 | 130 |
| Example 4 | N,N,N-trimethyl-N-2-hydroxypropyl ammonium phenoxide (Example 1) | 1.5 | 19 | 30 | 45 | 60 |
| Example 5 | N,N,N-trimethyl-N-2-hydroxypropyl ammonium nonyl phenoxide (Example 2) | 1.5 | 16 | 30 | 45 | 70 |
| Example 6 | N,N,N-n-propyl-N,2-hydroxypropyl ammonium phenoxide (Example 8)** | 2.0 | 14 | 27 | 65 | 90 |

*DMP-30 is 2,4,6-tris dimethylaminomethylphenol
**Rubinate-M, which is methylene-4,4-bisphenylene diisocyanate was used in place of Mondur MR and 10 grams of Fyrol® 2, which is a chlorinated phosphorous compound was added to impart flame retardancy to the resulting polyisocyanurate foam.

In addition to the fact that the compositions of this invention are highly active in the preparation of polyurethane and polyurethane-polyisocyanurate foams, they are more readily compatible with certain of the polyols in commercial use today than the catalyst con-

TABLE I

| | Reactants | | | | Titrimetric Analysis | |
|---|---|---|---|---|---|---|
| Ex. | Tertiary Amine | Carbinol | Solvent | Product | Meq/g Quat. | Meq/g Tertiary |
| 1 | Trimethylamine | Phenol | DPG | N,N,N-trimethyl-N,2-hydroxypropyl ammonium phenoxide | 1.86 | — |
| 2 | Trimethylamine | Nonyl Phenol | None | N,N,N-trimethyl-N,2-hydroxypropyl ammonium nonyl phenoxide | 1.94 | 0.25 |
| 3 | Tri-n-propylamine | Phenol | DPG | N,N,N-n-propyl-N,2-hydroxypropyl ammonium phenoxide | 0.70 | 0.89 | taining a heterocyclic moiety such as those described in Erner, U.S. Pat. No. 3,010,963.

Other well known polyurethane catalysts can be incorporated with the composition of this invention to produce a catalysts stream which is taylored to polymerize specific precursors into the desired type of foam.

We claim:

1. A polyurethane catalyst composition for the polymerization of a polyol and an organic polyisocyanate which comprises a mixture of a tertiary amine selected from the group consisting of trimethylamine, triethylamine, tripropylamine, triisobutylamine and mixtures thereof and a quaternary hydroxyalkyl tertiary amine base prepared by reacting substantially stoichiometric amounts of water or a carbinol selected from the group consisting of methanol, ethanol, benzyl alcohol, furfuryl alcohol, allyl alcohol, phenol, octylphenol, nonylphenol, methylphenol, methoxyphenol, ethoxyphenol, 3-diethylamino phenol, naphthol, resorcinol, 1,4-hydroquinone, chlorophenols, chloronaphthols and p,p'-dihydroxydiphenyldimethylmethane; an alkylene oxide selected from the group consisting of propylene oxide, ethylene oxide, 1,2-butylene oxide, 1,2-pentene oxide, styrene oxide, butadiene epoxide, diepoxides prepared from p,p'-dihydroxydiphenyldimethylmethane and epichlorohydrin, an olefin oxide having 9–14 carbon atoms and mixtures thereof; and a tertiary amine selected from the group consisting of trimethylamine, triethylamine, tripropylamine, triisobutylamine and mixtures thereof, wherein the tertiary amine in said composition is present in a catalytic amount of up to 50% by weight of the composition.

2. The catalyst composition of claim 1 wherein said quaternary hydroxyalkyl tertiary amine base is selected from the group consisting of N,N,N-trimethyl-N,2-hydroxypropyl ammonium phenoxide, N,N,N-triethyl-N,2-hydroxypropyl ammonium phenoxide, N,N,N-tri-n-propyl-N,2-ammonium phenoxide, N,N,N-triisobutyl-N,2-ammonium phenoxide and mixtures thereof and wherein said tertiary amine is trimethylamine, triethylamine, tri-n-propylamine, triisobutylamine and mixtures thereof, respectively.

* * * * *